3,677,896
PROCESS FOR PREPARING CRYSTALLINE MALTOSE
Masashi Kurimoto, Kaname Sugimoto, and Mamoru Hirao, Okayama, Japan, assignors to Hayashibara Company, Okayama, Japan
No Drawing. Filed Nov. 13, 1969, Ser. No. 876,608
Claims priority, application Japan, Nov. 18, 1968, 43/84,261
Int. Cl. C12b 1/00
U.S. Cl. 195—31 R
4 Claims

ABSTRACT OF THE DISCLOSURE

Process which comprises preparing a high-purity maltose solution by the use of $\beta$-amylase for the amylolysis and also $\alpha$-1,6-glucosidase which can eliminate from starch the $\alpha$-1,6-glucoside bond that hampers the amylolysis by the action of $\beta$-amylase, concentrating the resulting solution to a massecuite containing maltose crystals, and then spraying the massecuite in a drying column to obtain the final product.

---

This invention relates to a process for preparing high-purity crystalline powder of maltose in a simplified manner by gelatinizing a starch slurry, subjecting the gelatinized starch to the action of $\alpha$-1,6-glucosidase and $\beta$-amylase thereby producing a high purity maltose solution, concentrating the solution until crystallization takes place, and then spraying the resulting massecuite into a drying column.

Maltoses with purity of over 80 percent have been used as reagents in extremely limited applications and are very high priced. The reason for the expensiveness may be explained as follows. There has been no alternative for commercial production of maltose but to decompose a starch with $\beta$-amylase, the only enzyme capable of decomposing each starch molecule into a pair of glucose units. However, the principal constituent of starch, amylopectin, is of a huge branched structure and, while the main dextrose bond or 1,4-bond is hydrolyzed by $\beta$-amylase, the $\alpha$-1,6-glucoside bond which represents the diverging part of the branched structure remains undecomposed. If, therefore, natural starch is liquefied and thoroughly decomposed by $\beta$-amylase, the reaction terminates with a decomposition rate of slightly more than 70 percent, leaving a large amount of dextrin behind. Naturally the resulting sugar solution upon concentration will not afford maltose crystals. For this reason, it is necessary to repeat the process of recrystallization after removal by precipitation of the dextrin with alcohol or the like. This eventually reduces the yield to a few percent and increases the cost greatly.

The present inventors studied on the method of improving the ordinary process of manufacturing maltose so as to obtain a high-purity product with a good yield in a single operation.

For the purpose of realizing the above object, enzymes were searched for which could eliminate from starch the $\alpha$-1,6-glucoside bond that hampers the amylolysis by the action of $\beta$-amylase. As the result, excellent $\alpha$-1,6-glucosidase-producing strains were found out from among the strains which belonged to the genera Pseudomonas (ATCC 21262), Lactobacillus (ATCC 8008), Escherichia (ATCC 21073), Aerobacter, Micrococcus, Nocardia, etc.

With the use of the enzyme solutions prepared by culturing those strains, together with $\beta$-amylase, on liquefied starch in a number of ways, high-purity maltose solutions having maltose contents of more than 90 percent could be obtained at yields almost equivalent to the theoretical yields. The saccharified solutions were purified and concentrated to solutions having concentrations ranging from 70 to 80 percent. After the addition of seed the solutions were agitated and cooled, whereby large amounts of maltose crystals could be deposited.

These concentrated solutions containing crystals were sprayed from the top of a drying column downward in a forward stream paralleled to hot air, and powders consisting of hydrated crystals of maltose were successfully obtained. This reduces the cost of preparing maltose to less than a few percent of the cost by conventional processes and makes commercial production of maltose possible for the first time.

The process of the invention will now be explained in detail, step by step. The starch to be processed may be of any kind usually available such as, for example, the starch of sweet potato, Irish or white potato, corn, sago, or tapioca.

The first step of gelatinization should be carried out with care taken to limit the decomposition of 10 to 40 percent starch slurry to a dextrose equivalent value which is low enough to avoid further retrogradation of the starch. In this reaction whereby each of amylose molecules bonded together like a straight chain is decomposed into two units of dextrose by $\beta$-amylase, it always occurs that if the amylose molecule represents a polymer of an odd number of dextrose molecules one dextrose molecule remains and grows per molecule of amylose, thus lowering the purity of maltose. Therefore, it is necessary to keep the molecular weight of amylose as high as possible, or to restrict the decomposition of starch. In addition, complete dispersion of the whole to a homogeneously dispersed state must be ensured. To meet the requirements, the starch in a concentration between 10 and 40 percent may be dispersed at a high temperature of 160° C. and preferably decomposed to a dextrose equivalent between about 1 and 5. Where a liquefying enzyme is employed, the starch slurry containing such enzyme is continuously liquefied at a high temperature between 85° and 95° C. and the D.E. is limited to the range below 5. The same applies where an acid is used instead.

In the next step of saccharification, either $\beta$-amylase or $\alpha$-1,6-glucosidase may be added first. However, it should be noted that the gelatinized starch solution of a low D.E. value is highly viscous, easy to retrograde on cooling, and once retrograded it becomes inert to the enzymatic reaction. Thus, it is advisable to cool the gelatinized solution rapidly to a desired temperature as by a flash cooler and add an enzyme having a great stability against heat, as promptly and at as high a temperature as possible to avoid retrogradation, thereby promoting the amylolysis and decreasing the viscosity of the sugar solution, and then add the second enzyme and effect the reaction. In view of this, the enzymes to be added first at elevated temperature are preferably the heat-resistant $\beta$-amylase and $\alpha$-1,6-glucosidase produced by Lactobacillus bacteria. The temperature for this purpose ranges from about 60° to 70° C. After the drop of the viscosity, the second enzyme is added to promote the saccharification. The temperature is about 45° C., and the pH is adjusted to a value suitable for the enzymes. The reaction is concluded in one or two days. When there is any possibility of the saccharified solution containing some retrograded dextrin, it is desirable to add a small amount of $\alpha$-amylase thereby to decompose the residual dextrin in the course of saccharification, because this facilitates the subsequent purification.

The saccharified solution thus obtained is heated for deactivation of the enzymes, concentrated, decolored with active charcoal, and purified with an ion exchange resin to a pure sugar solution. Fractional estimation by paper chromatography indicates that the resulting maltose, comprising less than 1% glucose, 90 to 95% maltose, and 3–4% malttriose, is well comparable in purity to the existing reagents.

When this sugar solution is concentrated to 70 to 80 percent and is agitated with the addition of seed crystals at about 35° C., hydrated crystals of maltose readily deposit. Upon gradual cooling with stirring over a period of one to three days, an increasing number of microcrystals in the form of triangular flakes grow to a creamy state. Such a cream with a crystal deposition rate of over 35 percent was sprayed from the upper part of a spray drying column through a high pressure nozzle. The dry air, in paralleled flow, was kept at 80° to 90° C. The lower part of the column was provided with a moving bed of wire netting, and hot air was forced upward through the netting and the material is taken out of the column at a low speed. After a period of 30 to 40 minutes of holding, maltose in the form of hydrated crystalline powder was taken out. It was a fine, non-sticking powdery product of small globular shape.

The product was found on analysis to consist of complete hydrated crystals having a water content of 5 to 6 percent. The maltose content of the anhydrous material was 95 percent. It was a high purity maltose which did not absorb moisture and remained stable in air.

By the process according to the present invention the mass production of high purity crystalline maltose in continuous operation has become possible on the commercial basis. It thus opens up extensive applications for maltose in the fields of bacterial culture, fermentation, and food preparation, aside from new industrial applications.

EXAMPLE 1

Preparation of maltose (a) Sweet potato starch was purified to a 35% starch slurry, and the slurry was forced into a gelatinizing equipment, wherein it was directly heated with live steam at 165° C. for 20 minutes to a homogeneous gelatinized solution with a D.E. value of 2.2. Next, in a flash cooler, it was cooled to 65° C. The pH was 6.0. At this point, β-amylase was added at a rate of 20 units per gram of the starch, with stirring. During a residence time of 4 hours, the starch solution was continuously taken out and, while being cooled, was poured ino a saccharification tank. The pH of the solution was adjusted to 6.0, and α-1,6-glucosidase produced by a starch of Pseudomonas amyloderamossa (ATCC 21262) was added at a rate of 15 units per gram of the starch, and then saccharification was effected at 45° C. for 48 hours. The saccharified solution was heated for the deactivation of the enzymes, concentrated, decolored, and purified with ion exchange resins. The maltose content on the basis of the anhydride was 94 percent.

(b) A sweet potato starch slurry was purified and, after the adjustment of the pH with oxalic acid to 4.0, the slurry of a concentration of 35 percent was gelatinized by heating to 160° C. The D.E. value was 2.0. The viscid, homogeneous gelatinized solution thus obtained was cooled by a flash cooler to 50° C., the pH was adjusted to 6.0, 20 units of β-amylase and 20 units of the enzyme produced by Lactobacillus bacteria were added to each gram of the starch, and then saccharification was carried out for 48 hours. The saccharified solution upon decoloration with active charcoal, purification with ion exchange resins and concentration, in the usual manner, yielded a pure maltose solution. Fractional estimation by paper chromatography showed that the purity of the maltose was 93.5 percent.

(c) One hundred grams of corn starch was incorporated into 300 ml. of boiling water for gelatinization and dispersion. The solution was subjected to a pressure at 130° C. for 5 minutes, cooled to 80° C. while the pH was adjusted to 6.0, and β-amylase was added at a rate of 50 units per gram of the starch. The solution, following the reduction of the viscosity, was cooled to 45° C. and a pullulanase salted-out enzyme (ATCC 8724) was added at a rate of 20 units per gram of the starch. After saccharification at 45° C. for 48 hours, the resultant was heated, filtered, concentrated and purified by decoloration with active charcoal in the usual manner. The solution upon concentration to a water content of 15 percent gave colorless hydrated crystals. Analysis of the sugar composition showed that the product was a high purity maltose consisting, on the dry basis, of maltose, 92.5%; glucose, 2.0%; malttriose, 4.0%; and other substances, 1.5%.

(d) One hundred grams of waxy corn starch was gelatinzed (in the same manner as described in Example 1–a), cooled to 50° C., and, with the addition of 50 units of β-amylase per gram of the starch, the viscosity of the solution was decreased while the pH was maintained at 6.0, and then, with the addition of 20 units of pullulanase per gram of the starch, the solution was saccharified at 45° C. for 10 hours. Following this, α-amylase was added at a rate of 5 units per gram of the starch and, after further saccharification for 45 hours, the resultant was boiled, decolored, concentrated, and purified with Amberlite IR–120, IRA–68, and IRA–411 (registered trade names of Rohm and Haas Co.'s ion exchange resins). Upon further concentration, it was completely solidified with a water content of 13 percent. Analysis by paper chromatography indicated that the product contained 93.0% maltose. In the form of a 70% solution, it was crystallized to give microcrystals. After centrifugal separation and washing with water, the crystals yielded maltose with a purity of over 96 percent on the dry basis.

(e) Sweet potato starch in the form of a 25% slurry was liquefied with the addition of 0.2 percent of a bacterial liquefying enzyme at 90° C., and a liquid with a D.E. value of 1.7 was obtained.

It was cooled to 70° C. and, at pH 6.0, 30 units of β-amylase was added per gram of the starch to effect saccharification. When the viscosity of the solution was thereby decreased, 20 units of pullulanase and 20 units of α-1,6-glucosidase obtained from Pseudomonas bacteria (ATCC 21262) were added to each gram of the starch. With the pH adjusted to 5.5, the solution was saccharified at 45° C. for 46 hours, boiled, purified with active charcoal and concentrated in the usual manner. A syrup thus obtained with a water content of 13 percent immediately crystallized. Upon analysis it proved to consist of 95 percent of maltose on the dry basis. The yield was 95 percent on the dry basis.

(f) Five hundred grams of white potato starch in the form of an approximately 30% slurry was liquefied, with the addition of 0.2 percent of Neospitase (registered trade name of Nagase Sangyo Co.'s α-amylase), with pH 6 and at 88° C. The liquefaction was terminated upon arrival of the D.E. value to 2.7. Hot water was added to form a solution having a solid content of 20 percent. While being subjected to the action of β-amylase added at a rate of 50 units per gram of the starch, the solution was cooled from 80° C. and, where the viscosity was decreased, 40 units of the Pseudomonas enzyme was added per gram of the starch, and the solution at pH 5.5 was saccharified at 45° C. for 15 hours. Then, Neospitase was added at a rate of 5 units per gram of the starch. After a total saccharification time of 48 hours, the resultant was filtered upon heating and purified with active charcoal and ion exchange resins in the usual manner. The thus-obtained high purity maltose solution was concentrated to a water content of 15 percent and was crystallized. The anhydride yield was 90 percent of the material anhydride, and the maltose content was 94 percent on the dry basis.

(g) One hundred grams of corn starch was introduced into 300 ml. of boiling water and, after gelatinization, the resultant was subjected to a pressure at 130° C. for 5 minutes and then cooled to 45° C. The pH was adjusted to 6.0, and Pullulanase salted enzyme produced by *Aerobacter aerogenes* (ATCC 8724) was added at a rate of 20 units per gram of the starch. In several hours the viscosity of the solution gradually decreased, then 50 units of β-amylase was added to each gram of the starch, and saccharification was effected at 45° C. for 48 hours. Then, the resulting solution was heated, filtered, concentrated, and decolored and purified with active charcoal in the usual manner. The product, concentrated to a water content of 15 percent, was colorless crystals. Analysis showed that the product was high purity maltose with a sugar composition on the dry basis of 93.0% maltose, 1.5% glucose, 4.0% malttriose, and 1.5% other components.

(h) A 25% suspension containing 100 g. of waxy corn starch was gelatinized (in the same way as in Example 1–a), and 20 units of pullulanase and then 50 units of β-amylase were added per gram of the starch, and then the mixture was saccharified at 45° C. for 10 hours. Further, with the addition of 5 units of α-amylase per gram of the starch, the mixture was saccharified for 40 hours. The saccharified solution was boiled, decolored, concentrated, and purified with Amberlite IR–120, IRA–68 and IRA–411 (registered trade names of Rohm and Haas Co.'s ion exchange resins). The purified product, upon further concentration, is completely solidified with a water content of 13 percent. Analysis by paper chromatography showed that the sugar composition of the product comprised 93.0 percent of maltose on the dry basis. When it was crystallized in the form of a 70%. solution, minute crystals resulted. The crystals upon centrifugal separation yielded maltose with a purity of 96 to 97 percent.

(i) In the form of a 23% suspension 100 grams of purified sweet potato starch was gelatinized (in the same manner as described in Example 1–a). Next, pullulanase and α-1,6-glucosidase obtained from Pseudomonas bacteria (ATCC 21262) were added at rates of 20 units and 40 units, respectively, per gram of the starch. The pH was adjusted to 5.5 and amylolysis was effected at 45° C. for several hours. Then, β-amylase was added at a rate of 25 units per gram of the starch, and saccharification was carried out for a further period of 46 hours. The saccharified solution was boiled, purified with active charcoal in the usual manner, and concentrated. The resulting syrup with a water content of 13 percent immediately crystallized. Analysis showed that the maltose content of the product was 94.5 percent and the yield of anhydride, 95 percent.

(j) An approximately 30% slurry containing 500 g. of white potato was liquefied, after the addition of 0.2 percent of Neospitase (registered trade name of Nagase Sangyo Co.'s α-amylase), with pH 6.0 and at 88° C. The liquefaction was terminated upon arrival at a D.E. value of 2.7, and hot water was added to form a solution having a solid content of 20 percent. At 45° C. and pH 5.5, 40 units of Pseudomonas enzyme was added per gram of the starch and, following this reaction, 25 units of β-amylase was added to each gram of the starch. At 45° C. and pH 5.5, saccharification was effected for 15 hours, and then 5 units of Neospitase was added per gram of the starch. After a total saccharification time of 48 hours, the resultant was heated, filtered, and purified in the usual manner with active charcoal and ion exchange resins. The high purity maltose solution so obtained was concentrated to a water content of 15 percent and was crystallized. The solid yield was 92 percent on the dry basis of the material, and the solid maltose content was 94 percent on the dry basis.

(k) A purified corn starch solution, adjusted to pH 5.0 and a concentration of 15 to 35 percent, was forced by a metering pump into a multi-blade heat-agitation cylinder of a continuous starch-liquefying equipment. (Refer to the published specification of Japanese patent publication No. 1,998/1964.) With the supply of live steam, the temperature inside the cylinder was automatically controlled in the range of 160° C. to 165° C. and the flow rate was adjusted to ensure a residence time of 15 minutes. The decomposition rate of the gelatinized solution was approximately 1.5 to 2 D.E. For each gram of the starch 50 units of β-amylase was used. The gelatinized solution was injected into a vacuum cooler through a nozzle on the upper part. At the same time, β-amylase in an amount as above specified was injected from an enzyme injection nozzle on the upper part of the cooler. Under automatic control so that the gelatinized solution could be maintained at 65° C., the two were completely mixed up. The liquid was continuously taken out of the cooler from the lower part, cooled by a heat exchanger down to 45° to 50° C., and immediately 20 units per gram starch of α-1,6-glucosidase (ATCC 21262, ATCC 8724) was forced by a proportional pump and with the aid of an agitator into the solution. Immediately after the adjustment of the pH to 5.7 to 6.0, the solution was pumped into a saccharification tank, where the charge was reacted with stirring at 45° C. for 48 hours. The saccharified solution so obtained was purified and concentrated in the manner as described in the preceding instances. The purity of the resulting maltose was 94 to 95 percent.

(l) A gelatinized solution prepared by treating purified corn starch (in the same manner as described in Example 1–k), was decomposed with the α-1,6-glucosidase produced by the bacteria of *Lactobacillus plantarium*. This enzyme is a new discovery by the present inventors which is superior to Aerobacter enzymes in thermal resistance, withstanding heat above 55° C. It also exhibits and optimum reaction temperature of over 50° C. This enzyme was adopted and added to the solution in the following manner. The gelatinized solution at over 150° C. was injected into the vacuum cooler from the upper part and cooled to 50° to 56° C. while a solution of the enzyme produced by Lactobacillus bacteria and which was kept at 45° C. was also injected from the top of the cooler at a rate of 30 to 20 units per gram of the starch. The pH of the mixed solution was adjusted to 6.0. While the solution was cooled to 45° to 50° C., it was uniformly mixed with 50 units of β-amylase per gram of the starch.

In this case, it was also attempt to premix β-amylase with the enzyme of Lactobacillus bacteria (ATCC 8008) and add the two at the same time to the gelatinized solution. The result was not different from that obtained as above.

The reaction solution was kept at 45° to 50° C. for 48 hours and, upon conclusion of the reaction, it was heated and then decolored and purified with ion exchange resins by the usual method. The resultant was concentrated and crystallized with a water content of 10 percent. Analysis by paper chromatography of the sugar composition showed that a colorless, high purity product with a maltose content of over 93 percent on the dry basis had been obtained.

(m) A 25% suspension of purified sweet potato starch was gelatinized (by the same treatment as described in Example 1–k). The gelatinized solution was rapidly cooled down to 55° C. and, at the same time, a Lactobacillus enzyme solution and β-amylase solution were added, respectively, in amounts of 30 units and 50 units per gram of the starch. Gradually the mixture was cooled to 45° C. and 10 hours afterwards a liquefying enzyme (Neospitase, prepared by Nagase Sangyo Co.) was poured in at a rate of 5 units per gram of the starch, and then a reaction was carried out for 30 hours. Upon decoloration and purification for the reaction product in the usual manner, a maltose with a purity of 93 percent was obtained at a yield equivalent to 90 percent of the calculated value.

(n) A 20% suspension of purified waxy corn starch was liquefied (in the same manner as in Example 1–k), rapidly cooled down to 60° C., and β-amylase was added at a rate of 50 units per gram of the starch. With pH 6.0, the solution was reacted. Thereafter, with pH 5.5 and at 45° C. the enzymes produced by microorganisms of the genera Lactobacillus and Pseudomonas were added, respectively, in amounts of 15 and 20 units per gram of the starch. The mixture was decomposed at 45° C. for 40 hours. The saccharified solution was purified and decolored in the same way as in the preceding experiments. The yield was 90 percent and the purity of the maltose was 94 percent.

EXAMPLE 2

Preparation of crystalline powder of maltose

The purified solution of maltose obtained by the procedure of Example 1 was concentrated to 70 percent, poured into a crystallizer, and, with the addition of 2 percent of seed crystals of crystalline maltose, it was cooled from 35° C. downward with stirring. Over three days the solution was cooled to 20° C. and attained a crystallization rate of 47 percent. The resultant was sprayed from the upper part of a drying column through a 1.5 mm.-dia. nozzle, by means of a high pressure pump at 150 kg./cm.$^2$. Hot air at 85° C. was supplied from the upper part of the drying column, so that the charge was collected on a moving conveyor of wire netting in the lower part of the column. From below the conveyor warm air at 40° C. was blown up, while the charge was gradually conveyed out of the drying column. Thus, over a period of 40 minutes, crystalline powder was taken out. It was then packed in an aging column, where it was aerated with warm air for 10 hours to complete the crystallization and drying. The product was powdery crystals of maltose having a water content of 6 percent.

What is claimed is:

1. A process for preparing crystalline powder of maltose which comprises: liquefying a starch slurry of about 10–40% concentration to a low dextrose equivalent value below 5 while limiting decomposition and maintaining the molecular weight of the amylose contained therein as high as possible; flash cooling the liquified starch to about 50–80° C.; subjecting the cooled liquefied starch to the actions of β-amylase and α-1,6-glucosidase and reacting said starch at about 45° C. for about 1–2 days, thereby completely decomposing the starch to a solution containing greater than 90% maltose dry basis; purifying and concentrating the resulting saccharified solution to obtain a massecuite containing maltose crystals, and then dehydrating the resultant by spray drying.

2. A process for preparing crystalline maltose according to claim 1 wherein the α-1,6-glucosidase to be added to the liquefied starch is selected from the group consisting of varieties produced by strains of the genera Escherichia (ATCC 21073); Pseudomonas (ATCC 21262); Lactobacillus (ATCC 8008); Micrococcus (IFO 3333); Nocardia (IFO 3384); and Aerobacter (ATCC 8724).

3. A process for preparing crystalline maltose according to claim 1 wherein α-amylase is added in addition to the β-amylase and α-1,6-glucosidase, for the purpose of decomposing any remaining dextrin.

4. A process for preparing crystalline maltose according to claim 1 wherein a spray-drying column is employed which is equipped with a spray nozzle in the upper part of the drying chamber and also with a gas-permeable moving bed in the lower part thereof so that a stream of air can be supplied from the bottom of the column upward through said bed.

References Cited

UNITED STATES PATENTS

| 3,565,765 | 2/1971  | Heady et al.    | 195—31    |
| 3,582,399 | 6/1971  | Black           | 127—30 X  |
| 3,540,927 | 11/1970 | Niimi et al.    | 99—199 X  |
| 3,535,123 | 10/1970 | Heady           | 195—31    |
| 3,492,203 | 1/1970  | Mitsuhashi      | 195—31    |
| 3,477,874 | 11/1969 | Repsdorph et al.| 99—203    |
| 2,728,678 | 12/1955 | Sharp           | 99—199    |

FOREIGN PATENTS

| 1,144,950 | 3/1969 | Great Britain. |

OTHER REFERENCES

Lee et al., Arch. Biochem. Biophys., vol. 116, pp. 162–167, 1966.

A. LOUIS MONACELL, Primary Examiner

G. M. NATH, Assistant Examiner

U.S. Cl. X.R.

127—58